United States Patent [19]

Langan et al.

[11] Patent Number: 5,619,687
[45] Date of Patent: Apr. 8, 1997

[54] QUEUE SYSTEM HAVING A TIME-OUT FEATURE AND METHOD THEREFOR

[75] Inventors: John A. Langan; Marlan L. Winter, both of Austin; James M. Sibigtroth, Round Rock, all of Tex.

[73] Assignee: Motorola Inc., Schaumburg, Ill.

[21] Appl. No.: 200,040

[22] Filed: Feb. 22, 1994

[51] Int. Cl.$^6$ .................................................. G06F 13/00
[52] U.S. Cl. ........................ 395/557; 395/287; 395/427
[58] Field of Search ................................. 395/550, 700, 395/436, 437, 733, 740, 287, 292, 427

[56] References Cited

U.S. PATENT DOCUMENTS

| | | | |
|---|---|---|---|
| 3,804,987 | 4/1974 | Cooper | 129/15 A |
| 4,665,483 | 5/1987 | Ciacci et al. | 364/DIG. 2 |
| 5,193,193 | 3/1993 | Iyer | 395/725 |
| 5,283,902 | 2/1994 | Dorn | 395/725 |

*Primary Examiner*—Thomas M. Heckler
*Attorney, Agent, or Firm*—Elizabeth A. Apperley

[57] ABSTRACT

A queue memory system (10) provides a flexible memory transfer system which uses a single transaction to either store a memory value in a queue or to retrieve the memory value from the queue. A queue controller (20) controls the transfer of data between a queue memory (18) and the peripheral devices (22, 24). The queue controller generally includes a register (52, 62) which indicates an address to be accessed and a direction control signal. Additionally, each peripheral device has a queue control register which is configured to access a selected channel of the queue memory. The queue memory system described herein also efficiently uses the cycle time of a central processing unit (12) of the system to perform queue accesses without disrupting more general processing steps. For example, the queue memory system will wait (for up to thirty-two timing cycles) for a timing cycle in which the central processing unit does not require use of a bus. At that time, the queue memory system will transfer data between the queue and a peripheral device. An alternate option is to force the central processing unit to freeze operation so that data will be transferred immediately.

15 Claims, 5 Drawing Sheets

| ADDRESS | REGISTER | B15/7 | B14/6 | B13/5 | B12/4 | B11/3 | B10/2 | B9/1 | B8/0 |
|---|---|---|---|---|---|---|---|---|---|
| LBASE | LQR0HI | LQ0TX | LQ0FS | LQ0NW | LQ0EN | LQC01 | | | |
| LBASE+1 | LQR0LO | BIT 7 | - | - | - | - | - | - | BIT 0 |
| LBASE+2 | LQR1HI | LQ1TX | LQ1FS | LQ1NW | LQ1EN | | | | |
| LBASE+3 | LQR1LO | BIT 7 | - | - | - | - | - | - | BIT 0 |
| LBASE+4 | LQR2HI | LQ2TX | LQ2FS | LQ2NW | LQ2EN | LQC23 | | | |
| LBASE+5 | LQR2LO | BIT 7 | - | - | - | - | - | - | BIT 0 |
| LBASE+6 | LQR3HI | LQ3TX | LQ3FS | LQ3NW | LQ3EN | | | | |
| LBASE+7 | LQR3LO | BIT 7 | - | - | - | - | - | - | BIT 0 |

*FIG. 4*

| ADDRESS | REGISTER | BIT7 | BIT6 | BIT5 | BIT4 | BIT3 | BIT2 | BIT1 | BIT0 |
|---|---|---|---|---|---|---|---|---|---|
| BASE | QSR | Q3FF | Q3EF | Q2FF | Q2EF | Q1FF | Q1EF | Q0FF | Q0EF |
| BASE+1 | QIER | Q3FIE | Q3EIE | Q2FIE | Q2EIE | Q1FIE | Q1EIE | Q0FIE | Q0EIE |
| BASE+2 | QCR | Q3LNB | Q3LNA | Q2LNB | Q2LNA | Q1LNB | Q1LNA | Q0LNB | Q0LNA |
| BASE+3 | RESERVED | | | | | | | | |
| BASE+4 | QDR0 | BIT 7 | - | - | - | - | - | - | BIT 0 |
| BASE+5 | QDR1 | BIT 7 | - | - | - | - | - | - | BIT 0 |
| BASE+6 | QDR2 | BIT 7 | - | - | - | - | - | - | BIT 0 |
| BASE+7 | QDR3 | BIT 7 | - | - | - | - | - | - | BIT 0 |

QUEUE SYSTEM HAVING A TIME-OUT FEATURE AND METHOD THEREFOR

CROSS REFERENCE TO RELATED APPLICATION

This application is related to our commonly assigned copending patent application entitled:

"A General Purpose Queue System and Method Therefor" by Marlan L. Winter, John A. Langan, and James M. Sibigtroth, Ser. No. 08/200,033 and filed Feb. 22, 1994.

FIELD OF THE INVENTION

This invention relates generally to a queue system, and more particularly to a queue system in a data processor.

BACKGROUND OF THE INVENTION

In many data processing applications, data is communicated between peripheral devices in a data processor and a memory. In general purpose systems which have a single memory for communicating with several peripheral devices, a direct memory access (DMA) circuit may be used to interface between each of the peripheral devices and the memory. The DMA circuit provides a general purpose method for communicating data between peripheral devices and the memory in a data processing system. By using the DMA circuit, the central processing unit is not required in accessing the memory for the required information. However, the central processing unit must temporarily halt operation while a memory transfer is taking place.

A dedicated queue memory uses less circuitry and typically does not require intervention by a central processing unit (CPU) to perform a memory access as compared to a DMA circuit. However, the queued memory is not as general as the DMA circuit and is typically designed for a specific peripheral device. Because of the different data interface requirements of each of the peripheral devices which may be implemented in a data processing system, the queued memory used for each of the peripheral devices must be designed for use only in a respective peripheral device. Therefore, the queued memory is included as a part of each peripheral device and must be redesigned each time the peripheral device is modified. Such specificity often results in increasing overhead during a design phase of manufacture.

In each of the DMA and the queued memory, an internal system bus is required to transfer data. In both types of systems, two options for using the internal system bus typically exist. In a first option, the central processing unit of the system in which either is implemented must be interrupted when a data transfer operation must be executed. The first option immediately halts a current operation when the data transfer must be executed. In a second option, the DMA and the queue memory wait an indefinite amount of time until a "free" cycle is available on the internal system bus. The "free" cycle occurs when the central processing unit is not using the internal system bus. However, while the second option does not interrupt important operations of the central processing unit, the DMA and the queued memory are required to wait an indefinite period of time before transferring data. In some situations, the period of time may be such that the data to be transferred is no longer valid and must be accessed again from the appropriate memory device.

Therefore, a need exists for a memory system which efficiently and effectively transfers data as required by both the central processing unit and a memory device which is implemented therein. Currently, solutions to this problem do not allow for efficient resolution of the problem, but require that either the central processing unit or the memory device (DMA or queued memory) operate in a less than efficient manner.

SUMMARY OF THE INVENTION

The previously mentioned needs are fulfilled with the present invention. Accordingly, there is provided, a method for executing a queue memory access operation. The method includes the steps of:

i. enabling a peripheral device to request access to a system address bus and a system data bus;

ii. determining when a central processing unit has accessed the system address bus and the system data bus;

iii. performing a data transfer operation between the peripheral device and a memory when the central processing unit does not have access of the system address bus and the system data bus;

iv. determining when a predetermined timeout period has expired when the central processing unit does have access of the system address bus and the system data bus;

v. performing the data transfer operation between the peripheral device and the memory when the predetermined timeout period has expired; and vi. repeating steps ii. through iv. if the predetermined timeout period has not expired.

In a second embodiment of the present invention, there is provided a queue memory system. The queue memory system includes a central processing unit for executing a plurality of data processing operations. The central processing unit provides a plurality of system data values, a plurality of system address values, and a system control signal. The queue memory system also includes a clock circuit for providing a timeout clock signal. A queue control circuit is connected to the central processing unit for receiving the plurality of system data values. The queue control circuit is connected to the clock circuit for receiving the timeout clock signal. The queue control circuit receives a plurality of general address values and a general control signal. The queue control circuit provides a transfer address signal. The queue control circuit includes a flow control circuit for asserting a queue drive signal in response to the timeout clock signal. The flow control circuit asserts the queue drive signal when the central processing has not provided the plurality of system data values and the plurality of system address values and a predetermined period of time has not expired. The queue memory system also includes a bus routing circuit coupled to the central processing unit for receiving the plurality of system address values and the system control signal. The bus routing circuit is connected to the queue control circuit for receiving the transfer address signal and the queue drive signal. The bus routing circuit provides the transfer address signal as one of the plurality of general address values when the queue drive signal is in a first predetermined logic state and the bus routing circuit providing the plurality of system address values as the plurality of general address values when the queue drive signal is in a second predetermined logic state.

These and other features, and advantages, will be more clearly understood from the following detailed description taken in conjunction with the accompanying drawings. It is important to note the drawings are not intended to represent the only form of the invention.

DETAILED DESCRIPTION OF A PREFERRED EMBODIMENT

The present invention provides a flexible queued memory system which may be used with a plurality of peripherals in a data processor. This queue memory system provides a flexible memory transfer system which uses a single transaction to either store a memory value in a queue or to retrieve the memory value from the queue. To enable the queue memory to interface with each of the peripheral devices in generally the same manner, a small amount of additional circuitry is designed in each of the peripheral devices for interface purposes. This additional circuitry and a data transfer protocol between the queue memory and each of the peripherals enables the queue memory system to provide a general queue memory which does not require a significant amount of circuit area. Effectively, the queue memory system described herein enables a designer to achieve more functionality while using less circuitry. Additionally, the queue memory is general purpose and may interface with several different types of peripherals without modification of data transfer protocol and without the need of queues specifically designed to work with only one peripheral.

The queue memory system is able to provide greater functionality with less circuitry by using a queue controller to control the transfer of data between the queue memory and the peripheral devices. The queue controller generally includes a register which indicates an address to be accessed when a queue operation is requested and receives a direction control signal to indicate whether the queue operation is to store or to retrieve data from that address. Additionally, each peripheral device has a queue control register which is configured to access a selected channel of the queue memory. A peripheral device may then issue a request to access the queue memory via a plurality of queue request signals. The queue then receives data from or provides data to a data bus depending on the function required by the peripheral device. During the same timing cycle in which the queue communicates data, the peripheral device may write data to or read data from the data bus. Therefore, the queue memory system described herein effectively allows each peripheral to access a single general purpose queue memory in a single timing cycle such that both the efficiency and speed of the memory system are optimized. A more detailed description of operation of the queue memory system will be subsequently provided.

The queue memory system described herein also efficiently uses the cycle time of a central processing unit of the system to perform queue accesses without disrupting more general processing steps. For example, the queue memory system of the preferred embodiment will wait for a timing cycle in which the central processing unit does not require use of a bus. At that time, the queue memory system will transfer data between the queue and a peripheral device. In that manner, the central processing unit of the system is not forced to wait to perform a processing step while the memory transfer between the queue and the peripheral device is executed.

Although the queue memory system described herein is designed to wait for an unused, or "dead", bus cycle before performing a memory transfer, the queue memory system also uses a timer feature which allows it to freeze execution of the central processing unit after a specified amount of time has passed where a dead bus cycle has not occurred. Therefore, the queue memory is not forced to wait too long before performing a memory transfer. The ability of the queue memory system to both wait for an unused processing cycle and to halt the central processing unit allows the system described herein to efficiently perform both general processing steps and memory transfers. In contrast, prior art solutions typically required the processing unit to halt for at least one bus cycle while performing any memory transfer. Therefore, at least one bus cycle was not used by the CPU for any purpose during a memory transfer involving a direct memory access circuit.

Figure 1:
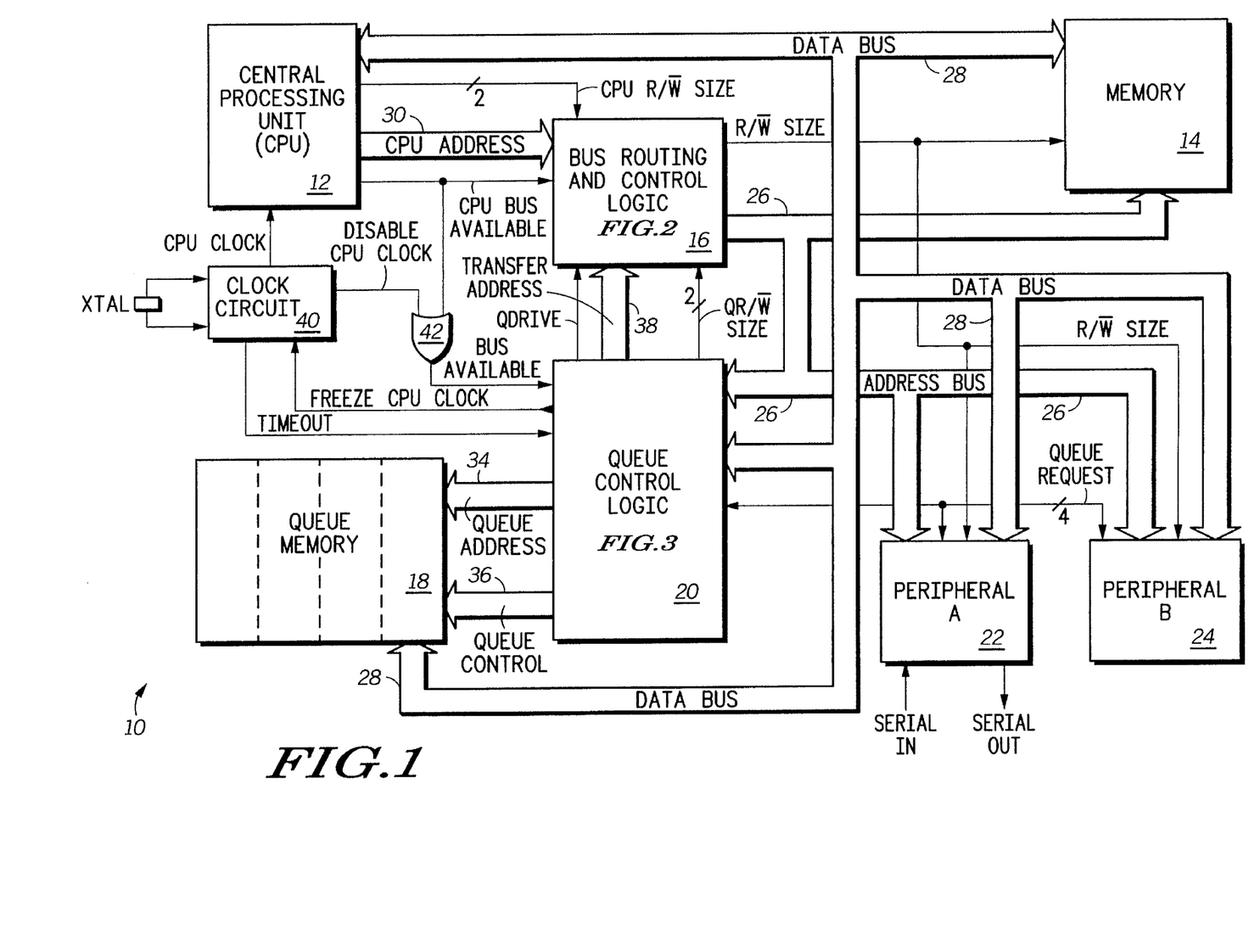
FIG. 1 illustrates in partial block diagram form a queued memory system in accordance with the present invention.

Additionally, during a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. It should also be noted that a "$" preceding a value indicates that the value is hexadecimal.
Description of Connectivity FIG. 1 illustrates a queue memory system 10. Queue memory system 10 generally includes a central processing unit (CPU) 12, a memory 14, a bus routing and control logic circuit 16, a queue memory 18, a queue control logic circuit 20, a peripheral A 22, and a peripheral B 24, a clock circuit 40 and an OR gate 42.

An external clock signal, "XTAL", provides a clock signal to clock circuit 40. Clock circuit 40 provides a signal labeled "CPU Clock" to CPU 12. Clock circuit 40 provides a signal labeled "Disable CPU Clock" to a first input of OR gate 42. Clock Circuit 40 provides a signal labeled "Time Out" to queue control logic circuit 20.

CPU 12 is bidirectionally coupled to each of memory 14, queue memory 18, queue control logic circuit 20, peripheral A 22 and peripheral B 24 via a Data bus 28. CPU 12 provides two signals, collectively labeled "CPU Read/ Write and Size (R/W and Size), to bus routing and control logic circuit 16. CPU 12 is also coupled to bus routing and control logic circuit 16 via a CPU Address bus 30. CPU 12 provides a signal labeled "CPU Bus Available" to both bus routing and control logic circuit 16 and a second input of OR gate 42. An output of OR gate 42 provides a signal labeled "Bus Available" to queue control logic circuit 20.

Bus routing and control logic circuit 16 provides a plurality of signals collectively labeled "R/W and Size" to each of memory 14, peripheral A 22, and peripheral B 24. An Address bus 26 couples address information from bus routing and control logic circuit 16 to each of memory 14, queue control logic circuit 20, peripheral A 22 and peripheral B 24.

Queue control logic circuit 20 is bidirectionally coupled to each of peripheral A 22 and peripheral B 24 via a plurality of Queue Request signals. In this example, there are four queue request signals. Queue control logic circuit 20 is coupled to bus routing and control logic circuit 16 to provide a QDrive signal and a plurality of signals collectively labeled "QR/$\overline{W}$ and Size". Queue control logic circuit 20 is also coupled to bus routing and control logic circuit 16 via a Transfer Address bus 38. Queue control logic circuit is coupled to queue memory 18 via a Queue Address bus 34 and a Queue Control bus 36. Queue control logic circuit 20 is also coupled to clock circuit 40 to provide a Freeze CPU Clock signal.

Peripheral A 22 receives a signal labeled "Serial In" from an external source (not shown) and provides a signal labeled "Serial Out" to an external receiver (not shown).

Figure 2:
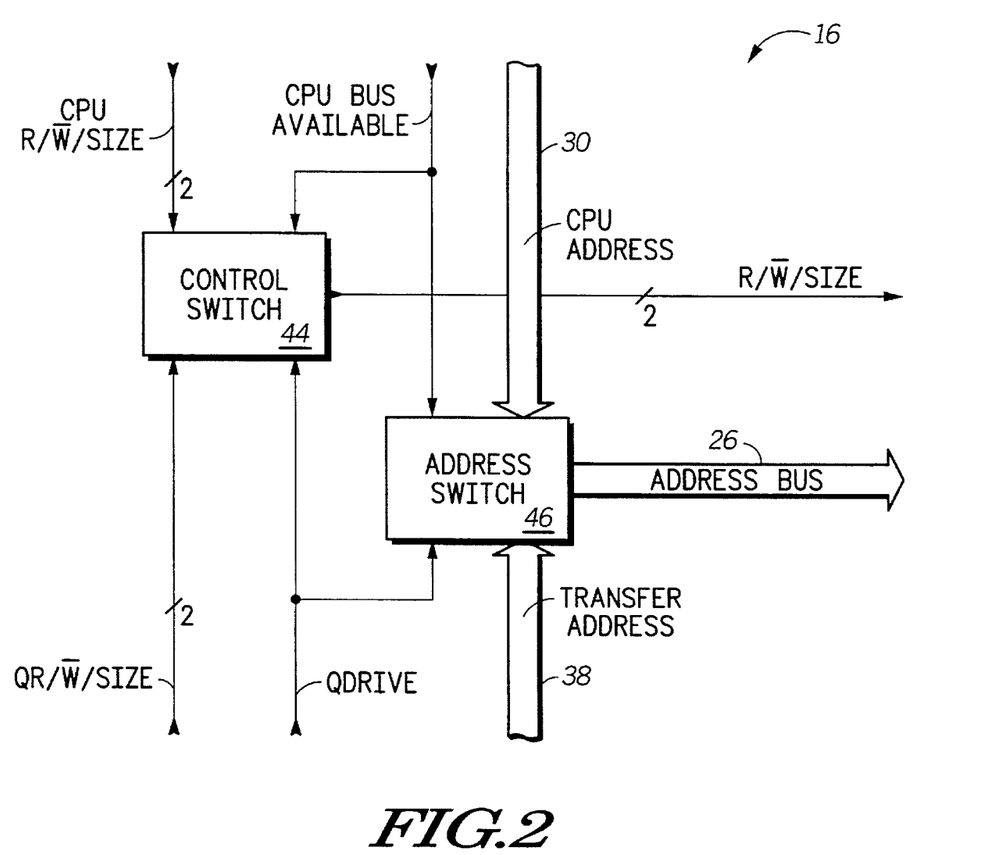
FIG. 2 illustrates in block diagram form a bus routing and control logic circuit of the queued memory system of FIG. 1.

FIG. 2 illustrates bus routing and control logic circuit 16. Bus routing and control logic circuit 16 generally includes a control switch 44 and an address switch 46. The CPU R/$\overline{W}$ and Size signals are provided to a first input of control switch 44. The QDrive signal is provided to a second input of control switch 44 and a first input of address switch 46. The QR/$\overline{W}$ and Size signals are provided to a third input of control switch 44. The CPU Bus Available signal is provided to a fourth input of control switch 44 and a second input of address switch 46. Control switch 44 provides the R/$\overline{W}$ and Size signals to a remaining portion of queue memory system 10.

CPU Address bus 30 provides a plurality of control signals to address switch 46. Transfer Address bus 38 provides a plurality of address signals to address switch 46. Address switch 46 provides a plurality of addresses via Address bus 26.

Figure 3:
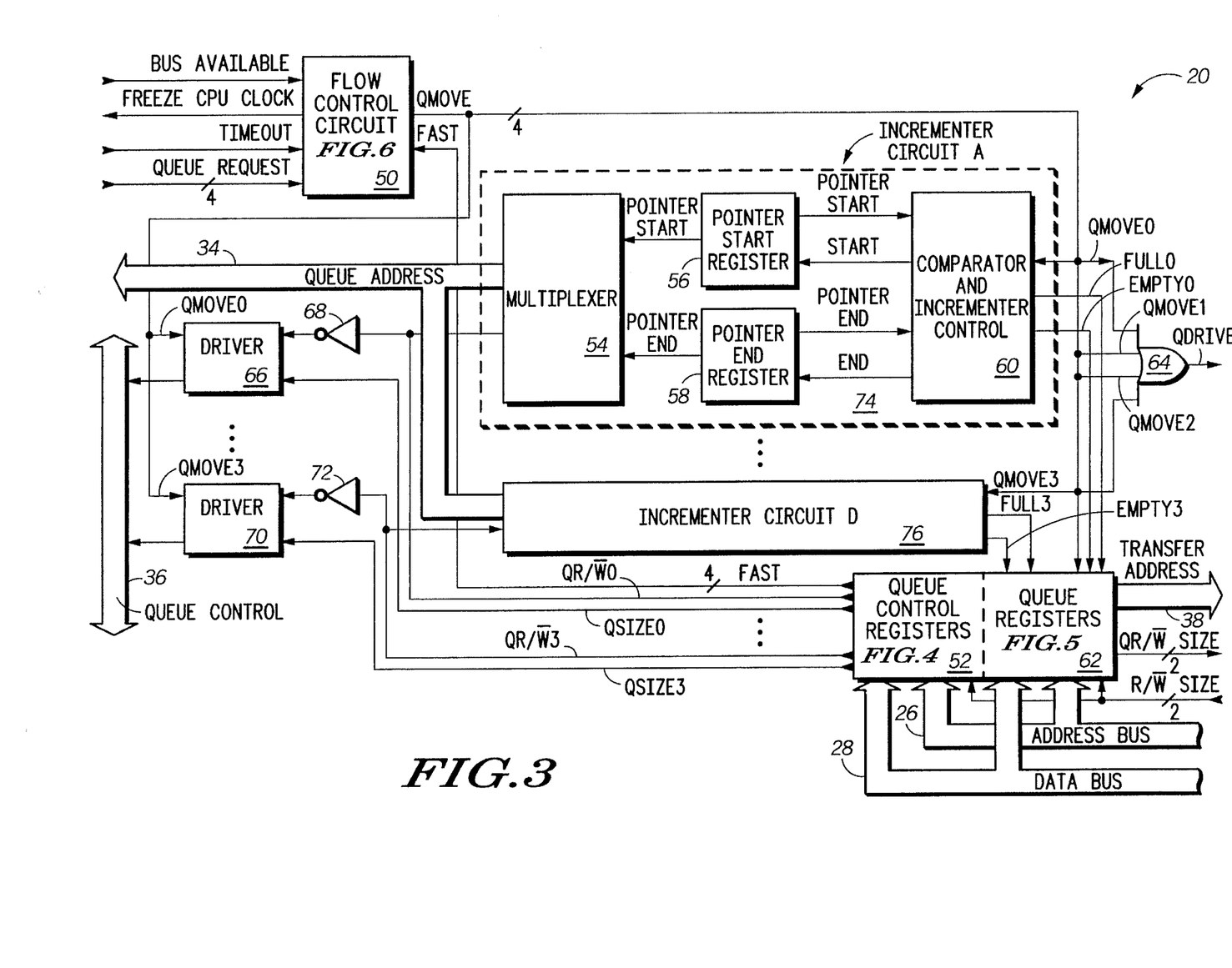
FIG. 3 illlustrates in block diagram form a queue control logic circuit of the queued memory system of FIG. 1.

FIG. 3 illustrates queue control logic circuit 20. Queue control logic circuit 20 generally includes a flow control circuit 50, a plurality of queue control registers 52, a plurality of queue registers 62, an OR gate 64, a plurality of drivers 66 through 70, a plurality of inverters 68 through 72, and a plurality of incrementer circuits A through D, 74 and 76 respectively. Each of incrementer circuits A through D (74 and 76, respectively) includes the components illustrated in incrementer circuit A 74. Incrementer circuit A 74 includes a driver 54, a pointer start register 56, a pointer end register 58, and a comparator and incrementer control circuit 60. A number of incrementer circuits required in queue control logic circuit 20 is equal to a number of queue channels which are to be accessed during operation of queue memory system 10. Like the plurality of incrementer circuits 74 through 76, a number of the plurality of drivers 66 through 70 is equal to the number of queue channels which are to be accessed during operation of queue memory system 10.

The Bus Available signal, the Timeout signal, and the plurality of Queue Request signals are provided to flow control circuit 50. Additionally, a plurality of signals labeled "Fast" is also provided to flow control circuit 50. How control circuit 50 provides the Freeze CPU Clock signal. Also, flow control circuit 50 provides one of a plurality of QMove signals to each of the plurality of incrementer circuits A through D (74 and 76). A first one of the plurality of QMove signals, labeled "QMove0", is provided to the comparator and incrementer control circuit 60 of incrementer circuit A 74. The QMove0 signal is also provided to a first input of OR gate 64. Similarly, a next two of the plurality of QMove signals are provided to a comparator and incrementer control circuit of a respective one of the plurality of incrementer circuits. In the embodiment of the invention described herein, the next two of the plurality of QMove signals are labeled "QMove1" and "QMove2." The QMove1 and QMove2 signals are also provided to the second and third inputs of OR gate 64, respectively. Although not shown herein, it should be understood that the QMove1 and QMove2 signals are also provided to comparator and incrementer control circuits similar to incrementer circuit A 74 and incrementer circuit D 76. A last one of the plurality of QMove signals, labeled "QMove3", is provided to a comparator and incrementer control circuit (not shown herein) of incrementer circuit D 76. The QMove3 signal is also provided to a fourth input of OR gate 64. OR gate 64 logically combines each of the plurality of QMove signals to provide the QDrive signal.

Each of the plurality of drivers 66 through 70 also receives a respective one of the plurality of QMove signals. Each of the plurality of QMove signals corresponds to one of the channels of queue memory 18. Therefore, a QMove0 signal is provided to driver 66 and a QMove3 signal is provided to driver 70.

Each of the comparator and incrementer control circuits of the plurality of incrementer circuits 74 through 76 provides a Full signal and an Empty signal which corresponds to a corresponding channel of the queue. For example, comparator and incrementer control circuit 60 of incrementer circuit A 74 provides a Full0 signal and an Empty0 signal. Similarly, the comparator and incrementer control circuit (not shown) of incrementer circuit D 76 provides a Full3 signal and an Empty3 signal. Each of the plurality of Full and Empty signals are provided to the plurality of queue registers 62.

The plurality of queue registers.62 provides an address signal via Transfer Address bus 38 and the QR/$\overline{W}$ and Size signals. Both the plurality of queue registers 62 and the plurality of queue control registers 52 receive the R/$\overline{W}$ and Size signals as well as the information transferred via Address bus 26 and Data bus 28. The plurality of queue control registers 52 provides a plurality of QR/$\overline{W}$ signals and QSize signals to a corresponding one of the plurality of drivers 66 through 70 and a corresponding one of the plurality of incrementer circuits 74 through 76. For example, the plurality of queue control registers 52 provide a QR/$\overline{W0}$ signal to both inverter 68 and incrementer circuit A 74. Inverter 68 inverts the QR/$\overline{W0}$ signal and provides an inverted signal to driver 66. The plurality of queue control registers 52 also provide a QSize0 signal to each of driver 66 and incrementer circuit A 74. Similarly, the plurality of queue control registers 52 provide a QR/$\overline{W3}$ signal to both inverter 72 and incrementer circuit D 76. Inverter 72 inverts the QR/$\overline{W3}$ signal and provides an inverted signal to driver 70. The plurality of queue control registers 52 also provide a QSize3 signal to driver 70 and incrementer circuit D 76. The plurality of queue control registers 52 also provide a plurality of Fast signals to flow control circuit 50.

As has been previously described, each of the plurality of incrementer circuits 74 through 76 includes a driver, a pointer start register, a pointer end register, and a comparator and incrementer control circuit. As is illustrated in more detail in incrementer circuit A 74, the QMove0, Full0, and Empty0 signals are coupled to comparator and incrementer control circuit 60. Comparator and incrementer control circuit 60 also receives a Pointer Start signal and a Pointer End signal. In response thereto, comparator and incrementer control circuit 60 selectively provides a Start signal to pointer start register 56 and an End signal to pointer end register 58. In addition to providing the Pointer Start signal to comparator and incrementer control circuit 60, pointer start register 56 also provides the Pointer Start signal to driver 54. Similarly, pointer end register 58 also provides the Pointer End signal to driver 54. Multiplexer 54 then provides an address value to Queue Address bus 34 from either pointer start or pointer end.

Description of Queue Control Registers

Figure 4:
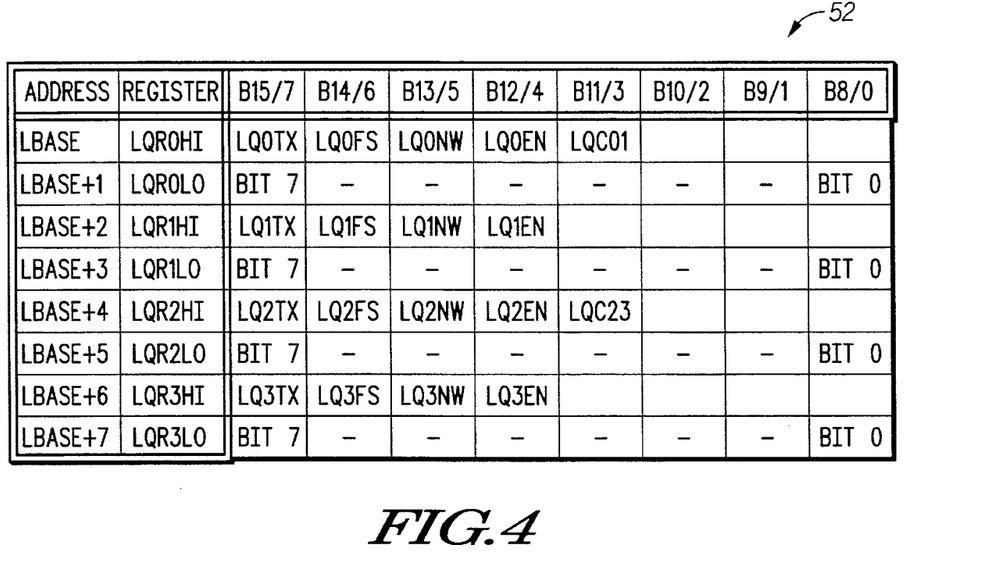
FIG. 4 illustrates in tabular form a plurality of queue control registers of the queue control logic circuit of FIG. 3.

FIG. 4 illustrates the plurality of queue control registers 52 in a tabular form. A starting address for a first one of the plurality of queue control registers is referred to as "LBase". Therefore, the subsequent addresses of each of the plurality of control registers are determined by the starting, or base address, plus an incremental value.

A pair of registers in the plurality of queue control registers 52 controls operation of a designated channel of queue memory 18. For example, registers LQR0HI and LQR0LO correspond to channel 0 of queue memory 18. Similarly, LQR1HI and LQR1LO correspond to channel 1, LQR2HI and LQR2LO correspond to channel 2, and LQR3HI and LQR3LO correspond to channel 3 of queue memory 18. In the following description of the registers and bits in each of the registers, "x" will be used to generically indicate one of channels 0,1,2, or 3. It should be noted that the two registers are effectively concatenated to form a sixteen bit register in which one register, designated by the "HI" suffix, is a high byte and the other register, designated by the "LO" suffix, is a low byte. With these conventions in mind, the function of each of the registers and of each bit in each of the plurality of queue control registers 52 will generally be described.

LQRxHI Queue Register x:

All bits in each register having a suffix of "HI" are reset to 0 and may be written any time.

LQxTX Queue Transmit (Direction):

A one in this bit indicates that data is to be transmitted from the queue to an address indicated in LQRxLO. A zero in any of these bits indicates that data is retrieved from the indicated address and transferred to queue memory 18.

LQxFS Queue Fast Data Move:

A one in this bit indicates that data should be moved between the queue memory 18 and a peripheral device (22 or 24) at the next possible cycle. A zero indicates that queue control logic 20 should wait and move data when there is a dead bus cycle or when a time-out occurs. When this bit is asserted, one of the plurality of Fast signals is asserted.

LQxNW Queue no wrap-around

A one in this bit indicates that further queue requests, transferred via the plurality of Queue Request signals, will be ignored if an associated interrupt line is active. If a user wishes to ensure that the queue is not over-written by incoming data when the queue is full, the user should enable interrupt on queue full. If the user wishes to ensure that the queue does not continue to transfer data when it is "empty", then the user should enable an interrupt on queue empty. This bit has no effect if both interrupts are disabled. A zero in this bit will allow the queue to wrap around, re-transmitting the same data if it is "empty" and being over-written if it is full.

LQxEN Queue Channel Enable

A one in this bit enables a corresponding channel and a zero in this bit disables the corresponding channel.

LQC01 (23) Queue Concatenate Channels 0 and 1 (2 & 3)

A one in this bit indicates that channels 0 and 1 or channels 2 and 3 act as a single sixteen bit channel, rather than as two eight bit channels. When channels 0 and 1 are concatenated, the control registers corresponding to channel 0 control operation of the sixteen bit concatenated queue channel. Similarly, when channels 2 and 3 are concatenated, the control registers corresponding to channel 2 control operation of the sixteen bit concatenated queue channel. A zero in LQC01 indicates that channels 0 and 1 act as independent eight bit channels. Similarly, a zero in LQC23 indicates that channels 2 and 3 act as independent eight bit channels.

LQRxLO LIM Queue address

As previously mentioned, these bits correspond to the lower eight address bits which will be accessed when a queue move is requested. The upper eight bits of address will correspond to a place in which internal registers are mapped in memory.

Description of Queue Registers

Figure 5:
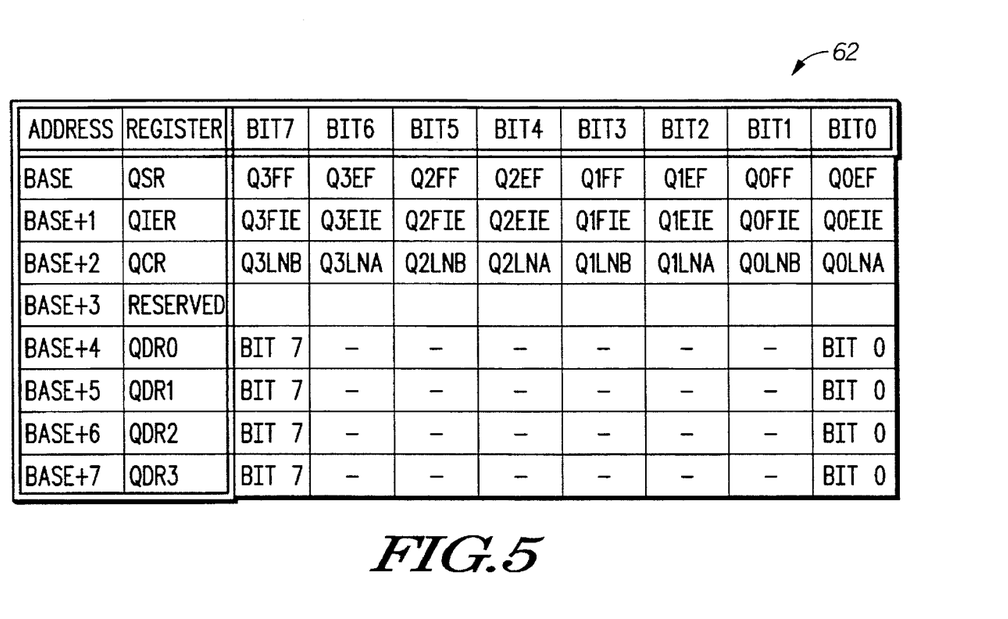
FIG. 5 illustrates in tabular form a plurality of queue registers of queue control logic circuit of FIG. 3.

FIG. 5 illustrates the plurality of queue registers 62 in a tabular form. A starting address for a first one of the plurality of queue registers is referred to as "Base". Therefore, the subsequent addresses of each of the plurality of registers are determined by the starting, or base address, plus an incremental value. In the following description of the registers and bits in each of the registers, "x" will be used to generically indicate one of channels 0,1,2, or 3. With these conventions in mind, the function of each of the registers and of each bit in each of the plurality of queue registers 62 will generally be described.

QSR Queue status register:

At reset, a plurality of queue empty bits, denoted by an "EF" suffix, are forced to a value of one. A plurality of queue full bits, denoted by a "FF" suffix, are forced to a value of zero. The plurality of queue full bits are read only bits which may not be written.

QxFF, QxEF Queue Interrupt Flags:

Each bit of the QSR queue status register located at the Base address will be discussed in more detail. QSR contains the interrupt flags for Qx Full (QxFF) and Qx Empty (QxEF). A logic value of one in an interrupt flag indicates the flag is active and will cause an interrupt if an associated enable bit is also asserted.

A full flag (QxFF) is set when there have been a preselected number of write operations, L, more than read operations. Assume in this example that L is equal to a length of queue memory 18. The full flag is cleared when a queue read operation is executed. If more data is written to queue memory 18 after it is full, the data will still be written into the queue, replacing the oldest data in the queue. Read operations will continue to provide data in a first-in first-out (FIFO) format, but the oldest data will be lost. In the present embodiment of the invention, the most recent L data values are always available.

The empty flag (QxEF) is set when there have been L read operations more than write operations. Again, L is equal to a length of queue. The empty flag is cleared when a write operation is executed. Reading the data from the queue is non-destructive and, therefore, the entire queue may be read repeatedly. The empty flag will be set after reading the contents of queue memory 18 a first time and will subsequently remain asserted. If the queue is written after it is empty, the data will be stored in the queue such that the data will be read during a next read operation regardless of an amount of data read when the queue was "empty".

QIER Queue Interrupt Enable Register:

In the QIER, all bits are reset to zero and may be written any time during operation.

QxFIE, QxEIE Queue Interrupt Enable Bits:

Each bit of the QIER queue status register located at a Base+1 address will be discussed in more detail. QIER contains the interrupt enables for Qx Full (QxFIE) and Qx Empty (QxEIE). A logic one in any of the enable bits indicates the associated interrupt is enabled.

It should be noted that each queue channel of queue memory 18 has its own interrupt vector. If the queue channels are concatenated, then separate vectors may be used to indicate the queue is full and the queue is empty. This indication is performed by selecting one queue channel's enable to indicate the queue is empty and the other queue channel's enable to indicate the queue is full. For example, Q0FIE may be used to indicate the queue is full and Q1EIE may be used to indicate the queue is empty.

QCR Queue Control Register:

In the QCR, all bits are reset to zero and may be written any time during operation.

QxLNB, QxLNA Queue length selects:

The QxLNB and QxLNA bits of the QCR the length selected for each of the queue channels (QxLNB, QxLNA). Table 1 shows the state of the bits and a resulting length of the queue.

TABLE 1

| Length | QxLNB | QxLNA |
|---|---|---|
| 32 bytes | 0 | 0 |
| 24 bytes | 0 | 1 |
| 16 bytes | 1 | 0 |
| 8 bytes | 1 | 1 |

QDRx Queue data register:

When read by an external user, the QDRx provides the RAM location within the queue which contains the oldest data according to a pointer start value. Similarly, writing the QDRx writes the next available RAM location in the queue according to a pointer end value.

General Description of Operation

During operation of queue memory system 10, an external user of the system must first program queue control logic circuit 20 to function in a manner desired by the user. For example, each of the plurality of queue registers and each of the plurality of queue control registers must be programmed such that the specifications of the queue are established. Additionally, the peripherals which are going to communicate data with the queue memory must be programmed. Subsequently, the peripheral must request a channel to either store data to or retrieve data from the queue memory. When the request signal has been asserted, the queue memory and the peripheral work together to perform the read or write function. As will be subsequently discussed in more detail, queue control logic will selectively access the data and address bus when either the central processing unit controlling queue memory system 10 is not using the busses, a timeout has occurred, or a specified bit is set in the plurality of queue registers to indicate that the request of the peripheral should be performed as soon as possible.

When the plurality of queue control and queue registers are programmed, the peripheral must assert a queue request signal. The queue request signal indicates which channel of the queue is to be accessed during a subsequent memory transfer operation. When the queue request signal is asserted, the queue memory will either receive or provide data at a next available timing cycle. Because of the unique design of the queue memory system, only one timing cycle is required to both enable the queue memory to provide information to the data bus and enable the peripheral to read the information from the data bus.

Thus, the queue memory system described herein quickly and efficiently performs queue type memory transfer operations without requiring additional circuitry in each of the peripheral devices. Thus, the queue memory is general purpose and a user may decide when and where in the system the queue will be used. Other advantages will be subsequently discussed in more detail.

Detailed Description of Operation

During operation, the plurality of queue control registers 52 and queue registers 62 must first be programmed. In this embodiment of the invention, queue memory 18 may be configured to have from one to four channels. Each of the channels has a length of thirty-two bytes. The channels of the system may be concatenated to form different data widths. For example, a single queue may have a data width of eight bits. If that single queue was concatenated with another single queue, a resulting concatenated queue would have a data width of sixteen bits. The LQC01 and LQC23 bits in queue control register 52 allow an external user to program queue memory 18 to form such a concatenated queue.

As has been previously described in Table 1 in the Description of the Queue Channels, queue length select bits (QxLNB and QxLNA) are programmed to indicate a length of a channel of queue memory 18. Again, it should be noted, that the "x" in the queue length select bits indicates a channel of queue memory 18. For example, "x" may be equal to 0, 1, 2, or 3 to respectively indicate channel zero through channel three. When the queue length select bits are programmed, corresponding channels of queue memory 18 are restricted to a length indicated by the queue length select bits.

In the plurality of queue control registers 52, the LWxFS of each channel must be set to indicate whether a fast data move should be initiated or if queue memory should wait to communicate data until CPU 12 is not using Data bus 28 for a data processing operation. In the present implementation, queue memory 18 will wait up to thirty-two timing cycles to communicate data when the fast bit of a channel is not asserted. A user must also program a LQxNW bit of each channel to indicate if data values in the respective channel should be overwritten. As previously stated, when the LQxNW bit of a channel is asserted, queue requests by peripheral devices in queue memory system 10 will be ignored if the associated full interrupt signal is active. Therefore, if the user wishes to ensure that the queue is not over-written by incoming data when the channel is full, then the user should enable the interrupt on queue full (QxFIE). The interrupt on queue full will be subsequently discussed in more detail. Additionally, a queue channel enable bit (LQxEN) bit must also be asserted or negated to respectively enable or disable the channel (x) which is being programmed.

In the plurality of queue registers 62, the queue status register (QSR) must be reset such that each of the queue interrupt flags of each channel (QxFF and QxEF) may be used to indicate when a respective one of the queue channels is empty or full. Additionally, the queue interrupt enable bits (QxFIE, QxEIE) must be asserted to enable the queue interrupt flags to be set.

In addition to programming bits in each of the plurality of queue control registers 52 and the plurality of queue registers 62, each of peripheral A 22 and peripheral B 24 must be programmed to communicate with queue memory 18. As has been previously mentioned, each of peripheral A 22 and peripheral B 24 has a small amount of circuitry which is used to allow each to communicate with queue memory 18. This small amount of additional circuitry allows each of peripheral A 22 and peripheral B 24 to communicate with a queue (queue memory 18) which is not located within and characteristic to a design of the peripheral. For example, peripheral A 22 may be a serial control interface (SCI) and peripheral B 24 may be an analog to digital (A/D) converter. In the given implementation, both peripheral A 22 and peripheral B 24 may communicate with the same queue memory 18 with the addition of only a small amount of additional circuitry which enables each to assert a Queue Request signal to request a preselected channel for communicating data. Each of peripheral A 22 and peripheral B 24 will subsequently be discussed in more detail.

Assume in a first instance that peripheral A 22 has asserted a queue request signal indicating that channel 0 of queue memory 18 should be accessed to store a data value. Furthermore, assume that the queue interrupt enable bits for channel 0 (QOFIE, and QOEIE) are set such that if channel 0 is either empty or full, an appropriate queue interrupt flag will be asserted.

As was previously mentioned, queue memory 18 communicates information either when CPU 12 is not using Data bus 28 for a data processing operation or queue memory has waited for a predetermined period of time to access Data bus 28. Queue control logic 20 controls access to Data bus 28 and provides appropriate control information to bus routing and control logic circuit 16 to indicate whether CPU 12 or queue memory 18 may provide data and address information via Data bus 28 and Address bus 26, respectively.

Figure 6:
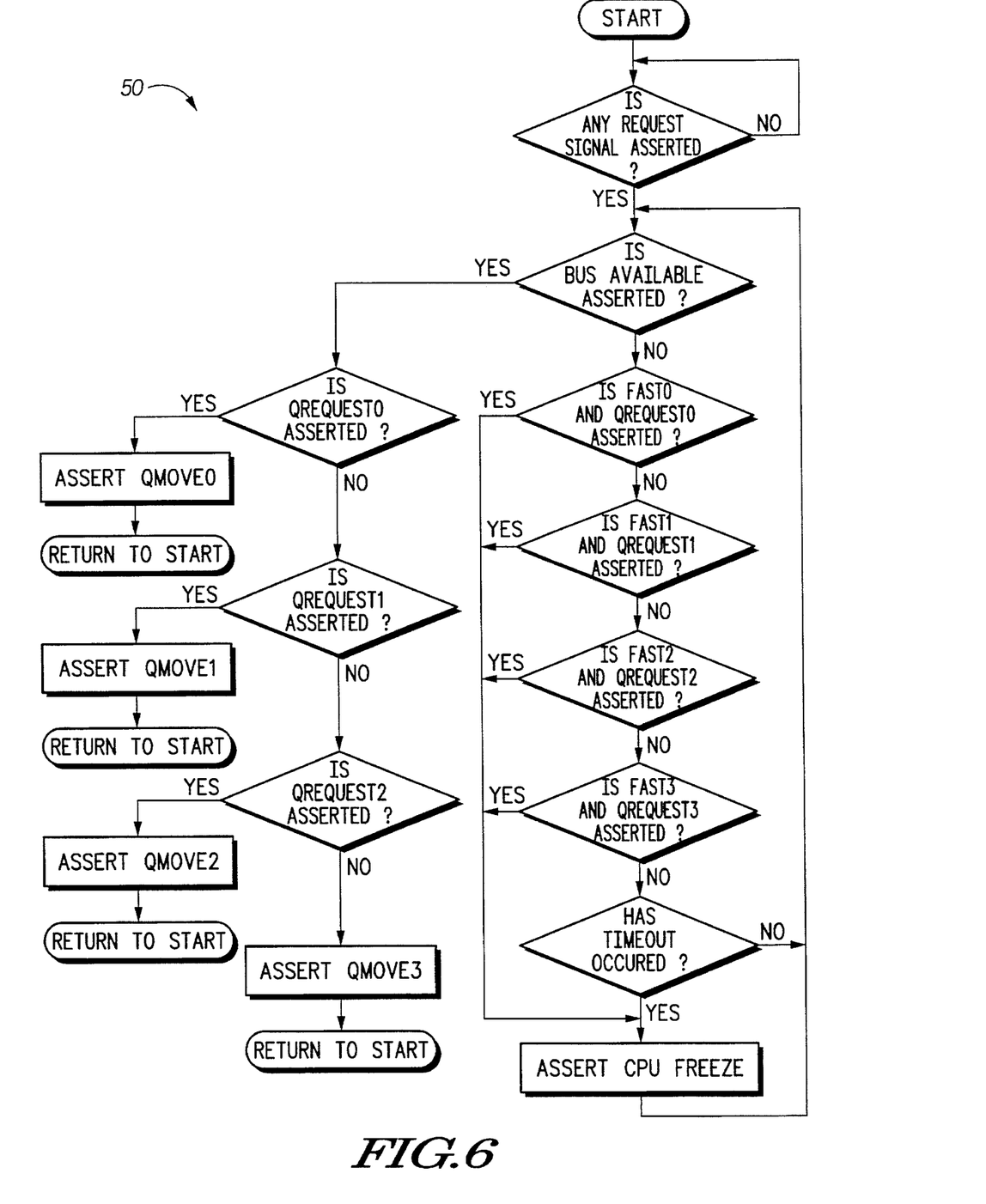
FIG. 6 illustrates in flow chart form a plurality of steps executed by flow control circuit of FIG. 3.

Flow control circuit 50 in queue control logic circuit 20 indicates when queue memory 18 may access Address bus 26 and Data bus 28. FIG. 6 illustrates a flowchart describing operation of flow control circuit 50. Before executing the steps illustrated in FIG. 6, however, flow control circuit 50 must receive the Bus Available, Timeout, and Fast signals.

The Bus Available signal is asserted when clock circuit 40 asserts the Disable CPU Clock signal or CPU 12 asserts the CPU Bus Available signal. In response to either of the asserted signals, OR gate 42 asserts the Bus Available signal. It should be noted that clock circuit 40 asserts the Disable CPU Clock signal when a predetermined timeout period has passed. Clock circuit 40 also asserts the Timeout signal when the predetermined timeout period has passed. The CPU Bus Available signal is asserted when CPU 12 is not using Data bus 28 to perform a data processing operation.

As illustrated in FIG. 6, flow control circuit 50 begins executing the steps of the flowchart when either peripheral device A 22 or peripheral device B 24 requests to communicate with queue memory 18 via the plurality of Queue Request signals. After receiving an asserted one of the plurality of Queue Request signals, flow control circuit 50 tests to determine if the Bus Available signal is asserted. If the Bus Available signal is not asserted, flow control circuit 50 determines if a Fast0 signal (determined by LQ0FS) and a Queue Request Signal (QRequest0) associated with channel zero of queue memory 18 are both asserted. If both are asserted, flow control circuit 50 asserts the Freeze CPU signal to force CPU 12 to not use Data bus 28 for one timing cycle. The freeze signal causes the CPU to temporarily stop processing and assert the Bus Available signal for one bus timing cycle starting at the next bus cycle boundary. Flow control circuit 50 then asserts the QMove signal and queue memory 18 is enabled to communicate data via Data bus 28. If either one of the Fast0 or QRequest0 signals is negated, flow control circuit 50 determines if a Fast1 signal (determined by LQ1FS) and a Queue Request Signal (QRequest1) associated with channel one of queue memory 18 are both asserted. Again, if both are asserted, flow control circuit 50 asserts the Freeze CPU signal to force CPU 12 to not use Data bus 28 for one timing cycle. Flow control circuit 50 then asserts the QMove signal and queue memory 18 is enabled to communicate data via Data bus 28. Similarly, if either one of the Fast1 and QRequest1 signals is negated, flow control circuit 50 determines if a Fast2 signal (determined by LQ2FS) and a Queue Request Signal (QRequest2) associated with channel two of queue memory 18 are both asserted. If both are asserted, flow control circuit 50 asserts the Freeze CPU signal to force CPU 12 to not use Data bus 28 for one timing cycle. Flow control circuit 50 then asserts the QMove signal and queue memory 18 is enabled to communicate data via Data bus 28. Again, if either one of the Fast2 and QRequest2 signals is negated, flow control circuit 50 determines if a Fast3 signal (determined by LQ3FS) and a Queue Request Signal (QRequest3) associated with channel three of queue memory 18 are both asserted. If both are asserted, flow control circuit 50 asserts the Freeze CPU signal to force CPU 12 to not use Data bus 28 for one timing cycle. Flow control circuit 50 then asserts the QMove signal and queue memory 18 is enabled to communicate data via Data bus 28. If either one of the Fast3 and QRequest3 signals is negated, flow control circuit 50 tests to determine if a predetermined period of time has passed. If the predetermined period of time has not passed, flow control circuit 50 again tests to determine if the Bus Available signal has been asserted. If the predetermined period has passed, flow control circuit 50 asserts the Freeze CPU signal to force CPU 12 to not use Data bus 28 for one timing cycle. Flow control circuit 50 then asserts the QMove signal and queue memory 18 is enabled to communicate data via Data bus 28.

If the Bus Available signal is asserted, flow control circuit 50 then tests to determine the highest priority request that is pending. The QRequest0 signal is asserted to indicate that a peripheral device wants to access channel zero of queue memory 18. If QRequest0 is asserted, queue control logic circuit 20 asserts the QMove0 signal. The QMove0 signal is provided to OR gate 64 to generate the QDrive signal. The QDrive signal enables queue memory 18 to communicate data via Data bus 28. If the QRequest0 signal is negated, flow control circuit 50 tests to determine if the QRequest1 signal is asserted to indicate that a peripheral device wants to access channel one of queue memory 18. If QRequest1 is asserted, queue control logic circuit 20 asserts the QMove1 signal. The QMove1 signal is provided to OR gate 64 to generate the QDrive signal. The QDrive signal enables queue memory 18 to communicate data via Data bus 28. Similarly, if the QRequest1 signal is negated, flow control circuit 50 tests to determine if the QRequest2 signal is asserted to indicate that a peripheral device wants to access channel two of queue memory 18. If QRequest2 is asserted, queue control logic circuit 20 asserts the QMove2 signal. The QMove2 signal is provided to OR gate 64 to generate the QDrive signal. The QDrive signal enables queue memory 18 to communicate data via Data bus 28. If the QRequest2 signal is negated, flow control circuit 50 determines that a peripheral device wants to access channel three of queue memory 18, and queue control logic circuit 20 asserts the QMove3 signal. The QMove3 signal is provided to OR gate 64 to generate the QDrive signal. The QDrive signal enables queue memory 18 to communicate data via Data bus 28.

Bus routing and control logic circuit 16 functions in conjunction with queue control logic 20 to provide address information via Address bus 26 which corresponds with Data bus 28. Bus routing and control logic circuit 16 receives information both from CPU 12 and from queue control logic circuit 20 and determines which information should be propagated to Address bus 26 and to the R/$\overline{W}$ signal. If the QDrive signal is asserted to indicate that queue memory 18 is going to communicate data via Data bus 28, control switch 44 of bus routing and control logic circuit 16 provides the QR/$\overline{W}$ signal as the R/$\overline{W}$ to each of memory 14, peripheral A 22 and peripheral B 24. Additionally, when the QDrive signal is asserted, address switch 46 is enabled to provide an address provided by queue memory 18 via Transfer Address bus 38 to each of memory 14, queue control logic 20, peripheral A 22, and peripheral B 24 via Address bus 26. Similarly, if the QDrive signal is negated to indicate that CPU 12 must communicate via Data bus 28, control switch 44 of bus routing and control logic circuit 16 provides the CPU R/$\overline{W}$ signal as the R/$\overline{W}$ to each of memory 14, peripheral A 22 and peripheral B 24. Additionally, when the QDrive signal is negated, address switch 46 is enabled to provide an address provided by CPU 12 via CPU Address bus 30 to each of memory 14, queue control logic 20, peripheral A 22, and peripheral B 24 via Address bus 26.

Both bus routing and control logic circuit 16 and queue control logic circuit 20 enable data to be efficiently transferred by both CPU 12 and queue memory 18. By recognizing that CPU 12 does not generally require use of Data bus 28 at all times, but often has free timing cycles, queue memory system 10 is able to efficiently use the free timing cycles to transfer data between queue memory 18 and the peripheral devices (22 and 24) without freezing operation of CPU 12. In the implementation of the invention described herein, CPU 12 typically only uses four out of every five timing cycles. A built in timeout mechanism ensures that queue memory 18 must only wait for a preselected period of time before communicating information. Although not implemented in this embodiment of the invention, the preselected period of time may be programmed by a user of queue memory system 10. Additionally, queue memory system 10 may be programmed to suspend operation of CPU 12 immediately by asserting the fast bits in the plurality of queue control registers 52. The flexibility provided by the present system effectively balances the efficiency of waiting for a free timing cycle with the user requirements for a timely transfer of data to/from the peripheral. Flow control circuit 50 as illustrated in FIG. 3 includes logic circuitry for generating QMove signals which correspond to each channel of queue memory 18. For example, a first portion of logic circuitry in flow control circuit 50 generates a QMove0 signal to indicate that channel zero of queue memory 18 requires Data bus 28. Similarly, a second, third, and fourth portion of logic circuitry in flow control circuit 50 respectively generate a QMove1, QMove2, and QMove3 signal to indicate that channels one, two, and three require Data bus 28. If any of the QMove0, QMove1, QMove2, and QMove3 signals are asserted, the QDrive signal is asserted.

Incrementer circuit A 74 has two modes of operation depending upon a state of LQOTX. When LQOTX is negated, the associated queue channel functions as a receive queue. When LQOTX is asserted, the associated queue channel functions as a transmit queue. Asserting QMove0 initiates incrementer circuit A 74 to perform a queue transfer. QR/$\overline{W0}$ controls a direction of data transfer to or from queue memory 18.

When a queue channel is configured as a receive queue, pointer start register 56 is treated as a "current address" and pointer end register 58 is treated as an end of queue marker. Initially, the pointer end and pointer start values are equal. When a new data value is stored in queue memory 18 from a peripheral device, multiplexer 54 passes the pointer start value via Queue Address bus 34 which identifies the address in queue memory 18 where the received value will be stored. Comparator and incrementer control circuit 60 then increments the value in pointer start register 56. Next, the pointer start value is compared to the pointer end value and a full flag (QOFF) is asserted if they are equal. When a data value is read from queue memory 18 by CPU 12, driver 54 passes the pointer end value via Queue Address bus 34 where the data value is read from queue memory 18. Comparator and incrementer control circuit 60 then increments the value in pointer end register 58. Next, the pointer end value is compared to the pointer start value and an empty flag (QOEF) is asserted if they are equal.

When a queue channel is configured as a transmit queue, pointer end register 58 is treated as a "current" address and pointer start register 56 is treated as an empty queue marker. Initially, the pointer end and pointer start values are equal. When a new data value is written into queue memory 18 from CPU 12, driver 54 passes the pointer end value via Queue Address bus 34 where the data value is written to queue memory 18. Comparator and incrementer control circuit 60 then increments the value in pointer end register 58. Next, the pointer end (current address) value is compared to the pointer start value and the full flag (QOFF) is asserted if they are equal. When a data value is transferred from queue memory 18 to a peripheral, multiplexer 54 passes the pointer start value via Queue Address bus 34 which identifies the address in queue memory 18 where data for the peripheral is read. Comparator and incrementer control circuit 60 then increments the value in pointer start register 56. Next, the pointer end (current address) value is compared to the pointer start value and the empty flag (QOEF) is asserted if they are equal.

Additionally, the QR/$\overline{W0}$ signal is inverted by inverter 68 and an inverted QR/$\overline{W0}$ signal is provided to driver 66. A QSize0 signal and a QRequest0 signal are also provided to driver 66 to respectively indicate a width of the value to be accessed in queue memory 18 and to again ensure that a correct channel is being accessed in response to a request by a peripheral device (for example, 22 and 24) of a data processing system in which the present queue system is implemented. Generation of the QSize0 signal and the QxLNB and QxLNA bits have been previously described. Driver 66 processes each of the signals described above to provide a plurality of control signals to control operation of channel zero of queue memory 18 via Queue Control bus 36.

Again, because the QDrive signal is asserted, bus routing and control logic circuit transfers the QR/$\overline{W}$ signal as the R/$\overline{W}$ signal and transfers the address provided by Transfer Address bus 38 via Address bus 26. If the QDrive signal had not been asserted, queue memory 18 would have waited to communicate information until flow control circuit 50 of queue control logic circuit 20 asserted the QDrive signal.

In addition to having a mechanism for allowing queue memory 18 and CPU 12 to share Data bus 28 and Address bus 26 in an effective manner, each of peripheral A 22 and peripheral B 24 have been designed to communicate with the same queue memory (18) without requiring individual queues or a complex and area consuming direct memory access circuit. Each of peripheral A 22 and peripheral B 24 have an internal register which an external user may program to communicate with queue memory 18 via the plurality of Queue Request signals. It should be noted that each peripheral is generally assigned to a particular channel of queue memory 18 by a user prior to initiating a data processing program. However, a number of peripherals is not limited by a number of channels of queue memory 18. In some implementations, a single peripheral will require more than one channel, while in other implementations, two or more peripherals will be able to share a channel. Of course, the number of channels is a design consideration and may be increased and decreased by a designer of the queue memory system. Additionally, logic circuitry or software might also be implemented for allowing more than one peripheral to use a channel at different times.

Description of Types of Peripheral Devices

Timer

In a first example, a peripheral device may be implemented as a timer. It should be noted that Timer circuitry is well known in the data processing art and is, therefore, not shown in detail in FIG. 1. Assume in this instance that peripheral B 24 is implemented as a timer with the appropriate data registers, pulse accumulators, and timer input capture and timer output compare flags. Following, is Table 2 illustrating possible control registers for allowing a timer system to function within queue memory system 10.

TABLE 2

| Address | Register | Bit 7 | Bit 6 | Bit 5 | Bit 4 | Bit 3 | Bit 2 | Bit 1 | Bit 0 |
|---------|----------|-------|-------|-------|-------|-------|-------|-------|-------|
| Base    | TSCR     | TDIS  | TSWAI | TSBCK | TFFCA | PAOQE | TC2QE | TC3QE | TC4QE |
| Base+1  | TQCR     | PAOQB | PAOQA | TC2QB | TC2QA | TC3QB | TC3QA | TC4QB | TC4QA |

Following is a description of several possible devices which may be used as peripherals and the registers which would be required for communication with queue memory system 10. A key aspect of each of the plurality of peripherals which will be discussed herein is the ability of each to request access to queue memory 18. Such a request will generally be transferred via a queue request signal. A second ability which each of the plurality of peripherals should have is a bit or signal which indicates when interrupt flags must be automatically reset in response to a queue transfer operation.

In general, there are two types of peripheral devices. A first type of device auto resets based on a transfer of information. After auto resetting, the first type of device is then ready to perform another function. In effect, the designated function executed by the first type of peripheral device is initiated by the transfer of information. An example of the first type of device would be an A/D converter which initiates an A/D conversion based on a transfer of a previous result (conversion) to a channel of queue memory 18. In this example, an internal register of the peripheral device would require only a control bit for selecting automatic flag clearing and a plurality of bits for indicating a channel of queue memory 18 with which the A/D converter is communicating.

A second type of device may perform the same functions as described in the first type of device. Additionally, the second type of device may "listen" to communication between queue memory 18 and another peripheral device without requiring any data transfer. For example, the second type of peripheral may be triggered by the condition of a predetermined queue line being asserted. The listening logic for the second type of peripheral typically monitors only the plurality of Queue Request lines to determine when another peripheral has initiated a data processing operation. An example of this type of peripheral is an A/D converter which initiates an A/D conversion based on the transfer of information between a timer peripheral and queue memory 18. This second type of peripheral would need the same control bit for selecting automatic flag clearing and a plurality of bits for indicating a channel of queue memory 18 with which the peripheral is to communicate. In addition the second type of peripheral would require a listening mode enable bit and a plurality of bits to select the queue request line to monitor.

A third type of device could be designed for listening operation only. This type of device would not have a data path connection to the queue memory but would be capable of reacting to a queue request event from another peripheral.

Following is a description of each bit of each of the Timer System Control Register (TSCR) and the Timer Queue Control Register (TQCR).

TSCR: Timer System Control Register

At reset all bits are 0 and the bits may be read and written at anytime.

TDIS: Timer Disable

A logic one disables the timer, including the counter. Such a feature may be used for reducing power consumption. A logic zero allows the timer to function normally.

TSWAI: Timer Stops While in Wait

A logic one disables the timer whenever queue memory system 10 is in a wait state. Wait mode is well known in the data processing art and will not be described in more detail herein. This feature is useful for reducing power consumption. When negated, this bit allows the timer to continue running in wait.

TSBCK: Timer Stops while in Background Mode

When asserted, this bit disables the timer when the part is in background mode. Typically, this bit will be asserted during system emulation. When negated, this bit allows the timer to continue running while in background mode.

TFFCA: Timer Fast Flag Clear All

A logic value of one changes all pulse accumulator overflow, timer input capture and timer output compare flags in the timer to a fast clear sequence. In the fast clear sequence, any access to an associated data register will cause the associated flag to clear if the flag is set at the time of the access. In some systems, the fast clear sequence may be used to make usage of the timer faster. Without the normal flag clearing sequence, the flags might be accidentally cleared if a user is not careful with their programming code.

When the TFFCA bit is negated, the timer flag clearing sequence functions normally, except for those timer channels or a pulse accumulator selected by the user to interface with the queue. Those timer channels perform a fast clear sequence. Any access to the associated data register will cause the associated TFFCA bit to clear if it was asserted at the time of the access.

PAOQE: Pulse Accumulator Overflow Queue Enable

When asserted, the PAOQE bit selects a pulse accumulator overflow to trigger a Queue Request signal selected by bits in a timer queue control register (TQCR). When negated, the PAOQE bit disables the pulse accumulator such that the pulse accumulator can not modify the Queue Request signal.

TC2QE: Timer Channel 2 Queue Enable

When asserted, the TC2QE bit selects a first timer input capture /output compare flag (2) to trigger a Queue Request signal selected by bits in a timer queue control register (TQCR). When negated, the first timer input capture/output compare flag (2) is not able to modify the Queue Request signal.

TC3QE: Timer Channel 3 Queue Enable circuitry is well known in the data processing art and is, therefore, not shown in detail in FIG. 1. Assume in this instance that peripheral B 24 is implemented as an analog to digital converter with the appropriate data registers. Following, is Table 4 illustrating possible control registers for allowing an analog to digital converter to function within queue memory system 10.

TABLE 4

| Address | Register | Bit 7 | Bit 6 | Bit 5 | Bit 4 | Bit 3 | Bit 2 | Bit 1 | Bit 0 |
|---|---|---|---|---|---|---|---|---|---|
| Base | ADSCR | ADPU | AFFC | | | | | ADTQE | ACCQE |
| Base+1 | AQCR | | | | | ADTQB | ADTQA | ACCQB | ACCQA |

When asserted, the TC3QE bit selects a second timer input capture/output compare flag (3) to trigger a Queue Request signal selected by bits in a timer queue control register (TQCR). When negated, the second timer input capture/output compare flag (3) is not able to modify the Queue Request signal.

TC4QE: Timer Channel 4 Queue Enable

When asserted, the TC4QE bit selects a third timer input capture/output compare flag (4) to trigger a Queue Request signal selected by bits in a timer queue control register (TQCR). When negated, the third timer input capture/output compare flag (4) is not able to modify the Queue Request signal.

TQCR: Timer Queue Control Register

All bits are reset to 0 and can be written any time.

Within the Timer Queue Control register, a plurality of queue request select bits (xyzQB, xyzQA) are stored. The queue request select bits select which one of the plurality of Queue Request signals is connected to which module of queue memory 18. If a system is built with more than one queue memory system, the plurality of queue select bits must be modified to access the additional queue channels. Table 3 illustrates the portion of queue memory 18 accessed by each respective combination of the plurality of queue select bits.

TABLE 3

| Queue Selected | xyzQB | xyzQA |
|---|---|---|
| Queue Channel #0 | 0 | 0 |
| Queue Channel #1 | 0 | 1 |
| Queue Channel #2 | 1 | 0 |
| Queue Channel #3 | 1 | 1 |

Once each of the bits described above has been programmed, a timer could be implemented in queue memory system 10. The plurality of queue select bits would be programmed to access a channel of queue memory 18. Once programmed, the timer could be programmed to either access information from queue memory 18 or to store memory to queue memory 18 upon some function of the timer. For example, every time an input capture channel captured a rising edge of an external signal, an associated time may be stored in a channel of queue memory 18 selected by the plurality of queue select bits. In another example, an output compare channel of the timer may reload the timer automatically to establish a common time base for all listening peripherals such that each executes its function on a synchronous periodic basis.

A/D Converter

In a first example, a peripheral device may be an analog to digital converter. It should be noted that analog to digital Following is a description of each bit of each of the A/D Converter System Control Register (ADSCR) and the A/D Converter Queue Control Register (AQCR).

ADSCR: A/D Converter System Control Register

At reset, all bits of the A/D Converter System control are negated. The bits may be read and written at any time during operation.

ADPU: A/D Converter Power Up

When asserted, the ADPU bit enables an A/D converter to begin to perform conversion operations. When negated, the ADPU bit disables the A/D converter and the A/D converter is no longer enabled to perform conversion operations.

AFFC: A/D Fast Flag Clear

When the AFFC bit is asserted, a flag clearing sequence normally executed is modified to a fast clear sequence. Any access to a result register associated with the A/D converter will cause the associated flag to be negated if the flag is asserted at the time. In some systems a fast flag clear sequence can increase the amount of time the A/D converter is available for use. It should be pointed out that without the normal flag clearing sequence, the flags might be accidentally cleared if a user is not careful with their programming code.

When the AFFC bit is negated, the complete flag clearing functions normally by executing a predetermined software sequence.

ADTQE: A/D Converter Trigger from Queue Enable

When asserted, the ADTQE allows the A/D converter to start a conversion when a queue transfer is requested via one of the plurality of Queue Request signals. The A/D is then in a queue listening mode of operation such that when the selected queue request line is asserted, the A/D converter begins a conversion operation. When the ADTQE bit is negated, the A/D converter is not performing a listening function, but is functioning as a typical A/D converter.

ACCQE: A/D Conversion Complete Queue Enable

When the ACCQE bit is asserted, an A/D conversion complete flag is selected to trigger a selected one of the plurality of Queue Request signals selected by the bits in A/D Converter Queue Control Register (AQCR). When the ACCQE bit is negated, the A/D conversion complete flag does not trigger any one of the plurality of Queue Request signals.

AQCR: A/D Queue Control Register

All bits of the AQCR are reset to zero and may be written at any time.

AyzQB, AyzQA Queue request select bits

These bits select which channel of queue memory 18 that is selected by the A/D converter. Table 5 illustrates the channel which is selected for each bit combination.

TABLE 5

| Queue Selected | AyzQB | AyzQA |
|---|---|---|
| Queue Channel #0 | 0 | 0 |
| Queue Channel #1 | 0 | 1 |
| Queue Channel #2 | 1 | 0 |
| Queue Channel #3 | 1 | 1 |

Once each of the bits described above has been programmed, an analog-to-digital converter could be implemented in queue memory system 10. The plurality of queue select bits would be programmed to access a channel of queue memory 18. Once programmed, the A/D converter could be programmed to "listen" to queue request signals and initiate a conversion operation in response to a request from a timer output compare. Additionally, the A/D converter could subsequently transfer conversion results to another channel of queue memory 18.

In a first instance, the A/D converter subsystem would monitor the plurality of Queue Request signals to determine when a particular channel of queue memory 18 is being written. If a preselected one of the plurality of Queue Request signals was asserted, the A/D converter would then start to sample input data provided by a source external to queue memory system 10. When the A/D converter has completed the sample, the A/D converter would assert one of the plurality of Queue Request signals as specified by the queue request select bits (AyzQB, ByzQA) as illustrated in Table 5. After asserting the one of the plurality of Queue Request signals and receiving an acknowledge via one of the plurality of QMove signals, the A/D converter would then send data to the channel of queue memory 18 requested by the one of the plurality of Queue Request signals. The A/D converter would then store the requested data and "listen" again for the preselected one of the plurality of Queue Request signals to be asserted. Typically, the other queue which is being accessed by the preselected one of the plurality of Queue Request signals is a timer output compare channel. Central processing unit 12 is not required to execute any of the functions described above. Therefore, central processing unit 12 may be used for other data processing operations while the A/D converter is accessing queue memory 18.

Generally, the A/D converter will be used to perform conversion operations either intermittently or continuously. A user who programs the A/D converter to perform conversion operations intermittently will probably be using the converter to determine temperature, flow, level in a tank, or another phenomena where only one or two datapoints and a datapoint value are used to determine some control parameters. The user who programs the A/D converter to perform conversion operations continuously is not interested in individual datapoints, but in the cumulative effect of a plurality of datapoints. Typically, such operations which require the cumulative effect of the plurality of data points are filters such as FFT's, DFT's, FIR's, and IIR's. In such intensive conversion operations, a periodic interrupt for sampling a data stream is required. In this system, the time spent in an interrupt related to an analog to digital conversion operation could be quite significant, especially if the sampling rate of the data stream is high. Queue memory system 10 could be programmed to efficiently implement a system which requires periodic sampling, by setting up a queued timer output compare and triggering an A/D data capture based on that queued timer output and then collecting A/D samples in a queue. Furthermore, queue memory system 10 allows CPU 12 to only interrupt one time to retrieve up to thirty-two samples. The efficiency of queue memory system 10 saves time by only requiring one interrupt as compared to thirty-two interrupts. Additionally, in prior art systems which required a CPU to be interrupted for scheduling A/D conversion operations, latency associated with the interrupt limited a number of A/D conversion operations which could be executed.

The basic steps in implementing a sampling A/D converter in queue memory system 10 will now be discussed. In a first step, channel zero of queue memory 18 would be filled with output/compare values to be provided to the timer peripheral. The timer (as previously discussed) would be programmed to be reloaded with new output compare values via channel zero of queue memory 18. Therefore, according to Table 3, the TC2QB and TC2QA bits would both be negated to indicate that channel zero of queue memory 18 is to be used during queue transfer operations. Next, the A/D converter must be programmed to listen to the QRequest0 signal to start a conversion operation. To program the A/D converter, the ADTQE and ACCQE bits of the A/D Converter System Control Register (ADSCR of Table 4) must be asserted. The ADTQB and ADTQA bits of the A/D Queue Control Register (AQCR of Table 4 and Table 5) must be negated to indicate that the A/D converter should start a conversion operation when channel zero of queue memory 18 communicates data. The ACCQB and ACCQA bits of the A/D Queue Control Register (AQCR of Table 4 and Table 5) must be set to 0 and 1 respectively to indicate that the A/D conversion results should be written to channel one of queue memory 18 when the conversion is completed. In addition to programming the registers in the A/D converter, the LQOTX and LQOFS bits of the LQROHI register of the plurality of queue registers 52 (FIG. 4) must be programmed to indicate a correct direction for data transfer and to determine the data transfer speed. Therefore, neither queue memory 18 nor the plurality of peripheral devices 22 and 24 are required to wait for CPU 12 to have a "dead" cycle on Data bus 28. In addition to the plurality of queue registers 52, the plurality of queue control registers 62 must be programmed to indicate a correct length of channel zero of queue memory 18 and to enable an interrupt to be asserted when channel zero of queue memory 18 is empty indicating that more timer output compare values are needed. Therefore, both the QOEIE, QOLNA, and QOLNB bits of the plurality of queue control registers 62 must be asserted. The A/D must then be programmed to transfer results of a conversion operation to channel one of queue memory 18 when the conversion operation is complete. As was previously discussed with respect to channel zero, channel one must then be programmed to indicate a correct direction for transfer of data (LQ1TX), a length of the queue channel one (Q1LNA, Q1LNB), and to interrupt when channel one of queue memory 18 is full (Q1FIE). For a more detailed description of each of the bits listed above, refer to the earlier discussion of FIG. 5. When each of the above steps has been executed, the A/D converter may execute conversion operations until either channel zero of queue memory 18 is empty or channel one of queue memory 18 is full. At that time, CPU 12 will be interrupted to service information in the queue memory 18.

It should be noted that the above example is not relevant only for analog to digital converters, but might also be used for digital to analog converters or other peripherals. When using a digital to analog converter, however, a user will need to transmit data at regular intervals rather than receive data as with the analog to digital converter. In this situation, you would follow steps similar to those discussed above. First, the digital to analog converter will be programmed with a value to transmit (which could come from another queue channel). The digital to analog converter could then be programmed to transfer the data when the Queue Request signal associated with an output compare channel of a timer is asserted. In effect, the digital to analog converter is "listening" for the timer to assert a Queue Request signal. When it senses that the timer has asserted the Queue Request signal, the digital to analog converter automatically requests a transfer of data from a previously assigned channel of queue memory 18. By using the plurality of Queue Request signals to provide timing information, the control necessary for each of the plurality of peripheral devices is greatly simplified. Furthermore, such a system allows a user to easily implement a modular system which may be easily modified in future revisions.

Serial Communications Interface

In a first example, a peripheral device may be implemented as a serial communication interface. It should be noted that serial communication interface circuitry is well known in the data processing art and is, therefore, not shown in detail in FIG. 1. Assume in this instance that peripheral A 22 is implemented as a serial communication interface with the appropriate data registers, receivers, and transmitters. Following, is Table 6 illustrating possible control registers for allowing the serial communication interface to function within queue memory system 10.

When the SFFCA bit is asserted, all serial communication interface receiver and transmitter flags are cleared in accordance with a fast clear sequence. Any access to an associated data register will clear an associated flag if it is asserted when the associated data register is accessed. A read operation will clear receiver bits and a write operation will clear transmit bits. In some systems, such a fast flag clearing sequence will increase the through-put of the serial communication interface. Additionally, it should be observed that without the normal flag clearing sequence, the receiver and transmitter flags might be accidentally cleared if a user is not careful with their programming code.

When negated, the SFFCA bit allows the serial communications interface to clear its flags normally. In the normal flag clearing operation, flag bits are cleared upon successful completion of a specific software sequence.

RDFQE: SCI Receiver Data Register Full Queue Enable

When asserted, the RDFQE bit enables a Queue Request signal selected by bits in SCQCR (Serial Communication Interface Queue Control Register) to be asserted when a receiver register is full. When negated, the RDFQE bit does not enable the Queue Request signal and the Queue Request signal is not asserted.

TDEQE: SCI Transmit Data Register Empty Queue Enable

TABLE 6

| Address | Register | Bit 7 | Bit 6 | Bit 5 | Bit 4 | Bit 3 | Bit 2 | Bit 1 | Bit 0 |
|---|---|---|---|---|---|---|---|---|---|
| Base | SCSCR | SCDIS | SSWAI | SSBCK | SCFCA | | RDFQE | RDEQE | TCFQE |
| Base+1 | SCQCR | | | RDFQB | RDFQA | TDEQB | TDEQA | TCFQB | TCFQA |

Following is a description of each bit of each of the Serial Communication System Control Register (SCSCR) and the Serial Communication Queue Control Register (SCQCR).

SCSCR: Serial Communication System Control Register

At reset all bits are 0 and the bits may be read and written at anytime.

SCDIS: Serial Communication Interface Disable

A logic one disables the serial communication interface, including a baud rate generator. Such a feature may be used for reducing power consumption. A logic zero allows the timer to function normally.

SSWAI: Serial Communication Interface Stops While in Wait

A logic one disables the serial communication interface whenever queue memory system 10 is in a wait state. Wait mode is well known in the data processing art and will not be described in more detail herein. This feature is useful for reducing power consumption. When negated, this bit allows the serial communication interface to continue running in wait.

SSBCK: Serial Communication Interface Stops while in Background Mode

When asserted, this bit disables the serial communication interface when queue memory system 10 is in background mode. Typically, this bit will be asserted during system emulation. When negated, this bit allows the serial communication interface to continue running while in background mode.

SFFCA: Serial Communication Interface Fast Flag Clear All

When asserted, the TDEQE bit enables a Queue Request signal selected by bits in SCQCR (Serial Communication Interface Queue Control Register) to be asserted when a transmitter register is empty. When negated, the TDEQE bit does not enable the Queue Request signal and the Queue Request signal is not asserted.

TCFQE: SCI Transmit Complete Queue Enable

When asserted, the TCFFQE bit enables a Queue Request signal selected by bits in SCQCR (Serial Communication Interface Queue Control Register) to be asserted when a transmission operation is completed. When negated, the TCFQE bit does not enable the Queue Request signal and the Queue Request signal is not asserted.

SCQCR: Serial Communication Interface Queue Control Register

All bits in the SCQCR are reset to zero and may be written any time.

xyzQB, xyzQA: Queue Request Select bits:

Within the Serial Communication Interface Queue Control register, a plurality of queue request select bits (xyzQB, xyzQA) are stored. The queue request select bits select which one of the plurality of Queue Request signals is connected to which module of queue memory 18. If a system is built with more than one queue memory system, the plurality of queue select bits must be modified to access the additional queue channels. Table 7 illustrates the portion of queue memory 18 accessed by each respective combination of the plurality of queue select bits.

TABLE 7

| Queue Selected | xyzQB | xyzQA |
|---|---|---|
| Queue Channel #0 | 0 | 0 |
| Queue Channel #1 | 0 | 1 |
| Queue Channel #2 | 1 | 0 |
| Queue Channel #3 | 1 | 1 |

Once each of the bits described above has been programmed, a serial communication interface could be implemented in queue memory system 10. The plurality of queue select bits would be programmed to access a channel of queue memory 18. Once programmed, the serial communication interface could be programmed to either access information from queue memory 18 or to store memory to queue memory 18 upon some function of the serial communication interface. For example, every time an input register was filled with a data value received from an external source, the data value may be stored in a channel of queue memory 18 selected by the plurality of queue select bits. This procedure may be repeated such that a set of information is stored in the selected channel of queue memory 18 and may be accessed as a whole message at a later point in time.

Summary of Operation of the Queue Memory System

Queue memory system 10 includes a queue memory 18 and queue control logic 20 which enables memory 18 to function as a general purpose first-in, first-out (FIFO) circular buffer. As was previously mentioned, queue memory 18 has four independent eight bit wide queue channels which are each thirty-two bytes long. If desired, the queue channels may be concatenated and used jointly as a sixteen bit queue which is thirty-two words long. Furthermore, each queue channel selectively outputs an interrupt either when the queue channel is full or when it is empty. If the queue channels are concatenated, a user of queue memory system 10 may select one vector for queue full and the other for queue empty. Furthermore, select bits allow the length of a queue channel to be reduced to twenty-four, sixteen, or eight bytes for a user who wishes to have a smaller queue.

When a queue data register in the plurality of queue registers 62 is written (either by user software or a queue move communication operation), a start pointer (see incrementer circuit A 74 in FIG. 3) is incremented to point to a next location in queue memory 18. Similarly, when queue memory 18 is read or a queue move operation occurs, an end pointer is decremented to point to a next read location. As long as both pointers do not equal the same value, queue memory 18 will operate in a circular fashion. If all the data in queue memory 18 is read, both pointers will be equal and an empty flag corresponding to the channel is asserted. As well, if all locations in queue memory 18 are written, both pointers will again be equal and a full flag corresponding to the channel is asserted.

Operation of queue memory 18 is controlled by queue control logic 20. When a queue operation is requested via one of the plurality of Queue Request signals (one Queue Request signal corresponds to each channel of queue memory 18), queue control logic executes a read or a write operation as specified by the QR/$\overline{W}$ signals and address register. At the same time, queue control logic selects an appropriate channel of queue memory 18 via one of the plurality of Queue Move signals. Again, each of the plurality of Queue Move signals corresponds to a single channel of queue memory 18. Queue control logic 20 and queue memory 18 are designed such that when a channel of queue memory 18 is selected by one of the plurality of Queue Move signals, queue control logic 20 will access the appropriate channel and perform a data processing function opposite to that indicated by the R/$\overline{W}$ signal. Therefore, the entire transfer between a peripheral device and queue memory 18 is performed in a single timing cycle. CPU 12 is not involved in the transfer of data using queue memory 18.

The "fast" bit (LQxFS) allows the user to select when a queue memory transfer should be executed immediately and when the queue memory transfer may wait for a bus cycle in which CPU 12 is not using Data bus 28. It should be noted that a time out feature is provided so that the queue memory transfer is not delayed indefinitely.

The queue memory system and method described herein allow a user to execute a variety of functions without using CPU 12. For example, a free running timer might use a queue channel to fill output compare values while a digital to analog converter (D/A), a pulse width modulator (PWM), and an analog to digital converter (A/D) were each performing their respective periodic duties. In each of the examples including a timer, a D/A converter, and a PWM circuit, CPU 12 would be required to fill a queue channel after data in the queue was used by the peripheral. However, CPU 12 would not be required to transfer date between a queue channel and a peripheral so the CPU could instead be in a low power mode or executing another function. Therefore, the flexibility of queue memory system 10 may be observed. Queue memory system 10 will perform equally well in both low power applications and in systems requiring high throughput.

The implementation of the invention described herein is provided by way of example only. However, many other implementations may exist for executing the function described herein. For example, peripheral devices other than those disclosed in detail may be used in queue memory system 10. A serial peripheral interface (SPI), a digital to analog converter, and an IRQ interrupt circuit are examples of other types of peripheral devices which would be efficiently and effectively used by the present queue memory system. As well, more than one queue memory may be implemented in queue memory system with the addition of only a slight amount of additional circuitry.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A method for accessing a queue memory in a data processing system, comprising the steps of:

i. requesting access to a system address bus and a system data bus by a first queue request signal provided by a peripheral device;

ii. selectively communicating a first data value between a central processing unit and the queue memory when the central processing unit has accessed the system address bus and the system data bus;

iii. selectively interrupting operation of the central processing unit and communicating the first data value between the peripheral device and the queue memory when the central processing unit has accessed the system address bus and the system data bus and a predetermined timeout period has expired;

iv. selectively communicating the first data value between the peripheral device and the queue memory when the central processing unit does not have access of the system address bus and the system data bus; and v. repeating steps ii. through iii. if the predetermined timeout period has not expired.

2. The method of claim 1 further comprising a step of:

determining when a predetermined control bit in a memory control register is set, the predetermined control bit selectively disabling the central processing unit from accessing the system address bus and the system data bus; and performing the data transfer operation between the peripheral device and the queue memory when the predetermined control bit in the memory control register is set.

3. The method of claim 2 wherein the predetermined control bit is a fast bit which is stored in a queue control register, the fast bit indicating that the peripheral device must quickly access the queue memory and the central processing unit should be disabled from accessing the system address bus and the system data bus.

4. The method of claim 2 wherein the predetermined control bit is programmed by an user which accesses the queue memory.

5. The method of claim 1 wherein a clock circuit provides a timeout signal to indicate when the predetermined timeout period has expired.

6. The method of claim 5 wherein the clock circuit provides a disable central processing unit clock signal to indicate when the predetermined timeout period has expired.

7. The method of claim 1 further comprising the step of:

waiting for a timing cycle before performing a data transfer operation between the peripheral device and the queue memory when the predetermined timeout period has expired.

8. The method of claim 1 wherein the central processing unit provides a central processing unit bus available signal to indicate whether the central processing unit has accessed the system address bus and the system data bus, the central processing unit asserting the central processing unit bus available signal to indicate the central processing unit accessed the system address bus and the system data bus, the central processing unit negating the central processing unit bus available signal to indicate that the central processing unit has not accessed the system address bus and the system data bus.

9. The method of claim 1 further comprising the step of: automatically resetting a flag value in a control register after transferring the first data value between the peripheral device and the queue memory.

10. A queue memory system, comprising:

a central processing unit for executing a plurality of data processing operations, the central processing unit providing a plurality of system data values, a plurality of system address values, and a system control signal, the system control signal indicating when the central processing unit has accessed a system data bus for transferring the plurality of system data values and when the central processing unit has accessed a system address bus for transferring the plurality of system address values;

a clock circuit for providing a timeout clock signal;

a queue control circuit coupled to the central processing unit for receiving the plurality of system data values, the queue control circuit being coupled to the clock circuit for receiving the timeout clock signal, the queue control circuit receiving a plurality of general address values and a general control signal wherein the general control signal indicates when the central processing unit is executing one of a read and a write operation, the queue control circuit providing a transfer address signal, the queue control circuit comprising:

a flow control circuit for asserting a queue drive signal in response to the timeout clock signal, the flow control circuit asserting the queue drive signal when the central processing unit has not provided the plurality of system data values and the plurality of system address values and a predetermined period of time has not expired; and a bus routing circuit coupled to the central processing unit for receiving the plurality of system address values and the system control signal, the bus routing circuit coupled to the queue control circuit for receiving the transfer address signal and the queue drive signal, the bus routing circuit providing the transfer address signal as one of the plurality of general address values when the queue drive signal is in a first predetermined logic state and the bus routing circuit providing the plurality of system address values as the plurality of general address values when the queue drive signal is in a second predetermined logic state.

11. The queue memory system of claim 10 wherein the first predetermined logic state is a logic one value and the second predetermined logic state is a logic zero value.

12. The queue memory system of claim 10 wherein the queue control circuit further comprises:

a queue control register coupled to the flow control circuit for providing a fast bit, the fast bit indicating that the peripheral device must quickly access the queue memory and the central processing unit should be disabled from accessing the system address bus and the system data bus, the flow control circuit asserting the queue drive signal when the fast bit is in a predetermined logic state.

13. A method for accessing a queue memory in a data processing system, comprising the steps of:

i. requesting access to a system address bus and a system data bus by a first queue request signal provided by one of a plurality of peripheral devices;

ii. selectively communicating a first data value between a central processing unit and the queue memory when the central processing unit has accessed the system address bus and the system data bus;

iii. selectively communicating the first data value between the peripheral device and the queue memory when the central processing unit has accessed the system address bus and the system data bus and a a predetermined timeout period has expired;

selectively communicating the first data value between a first one of the plurality of peripheral devices and a first channel of the queue memory when the central processing unit does not have access of the system address bus and the system data bus and when a first memory request signal is asserted;

selectively communicating the first data value between a second one of the plurality of peripheral devices and a second channel of the queue memory when the central processing unit does not have access of the system address bus and the system data bus and when a second memory request signal is asserted;

vi. selectively communicating the first data value between the first peripheral device and the queue memory when a first predetermined control bit in a control register is asserted, the central processing unit has accessed the system address bus and the system data bus, and the first memory request signal is asserted;

vii. selectively communicating the first data value between the second peripheral device and the queue memory when a second predetermined control bit in the control register is asserted, the central processing unit has accessed the system address bus and the system data bus, and the second memory request signal is asserted;

viii selectively communicating the first data value between the first peripheral device and the queue memory when the first memory request signal is asserted and when the predetermined timeout period has expired when the first and second predetermined control bits are negated;

viii. selectively communicating the first data value between the second peripheral device and the queue memory when the second memory request signal is asserted and when the predetermined timeout period has expired when the first and second predetermined control bits are negated; and ix. repeating steps ii. through vii. if the predetermined timeout period has not expired.

14. The method of claim 13 further comprising a step of:

asserting a processing freeze signal when the data transfer operation is to be performed.

15. The method of claim 13 wherein the first predetermined control bit is a first fast bit and the second predetermined control bit is a second fast bit, the first and second fast bits indicating that the peripheral device must quickly access the first channel and the second channel of the queue memory respectively, the first and second fast bits indicating the central processing unit should be disabled from accessing the system address bus and the system data bus.

* * * * *